Patented June 19, 1945

2,378,576

UNITED STATES PATENT OFFICE 2,378,576

RUBBERLIKE MATERIALS FROM DI-HYDROXYALKYL SULPHIDES

Tadao Okita, Imazucho, Nishinomiya, Japan; vested in the Alien Property Custodian No Drawing. Application November 29, 1939, Serial No. 306,683

5 Claims. (Cl. 260—79)

The present application is a continuation in part of my prior copending application Serial No. 94,194, filed August 4, 1936, for "Rubberlike materials from di-hydroxyalkyl sulphides."

The present invention relates to the method of manufacturing rubber-like materials under ordinary temperature or heating and with or without solvent, by the reaction of concentrated sulphuric acid, phosphoric acid, arsenic acid, boric acid anhydride, potassium bisulphate, zinc chloride, tin chloride and other metallic halides or ammonium chloride upon the materials which are expressed by $[(HO)C_nH_{2n}]_2S_x$ (where $n$ and $x$ are positive integers in this case).

The object of the present invention is an economical manufacture of such rubber substitutes.

Oil-proof rubber-like materials have hitherto been manufactured mainly by the working of saturated halide of hydrocarbon of a rather low molecular weight in water or in alkaline solvent upon the materials generative of sulphur such as alkali sulphides or alkaline earth metal sulphides, but the operation has not only been difficult but economically disadvantageous.

The present invention discloses the method of manufacturing elastic rubber-like materials under ordinary temperature or heating and with or without solvent, by the reaction of concentrated sulphuric acid, phosphoric acid, arsenic acid, boric acid anhydride, potassium bisulphate, zinc chloride, tin chloride and other metallic halides such as mercury chloride, calcium chloride, boron fluoride or ammonium chloride upon the chemicals which are expressed by $[(HO)C_nH_{2n}]_2S_x$ (where $n$ and $x$ are positive integers in this case). For example, by heating at 150° C. for an hour the mixtures of 100 grams of dihydroxyethyl disulphide and 100 grams of concentrated sulphuric acid, about 80 grams of rubber-like material can be obtained, which is of great elasticity and oil-proof property, and also of far less offensive odor than the one manufactured from ethylene chloride. In addition to the use of dihydroxy ethyl disulphide given above, either dihydroxy butyl disulphide or dihydroxy ethyl tetrasulphide may be employed.

In practising my invention the integer $n$ should be chosen between 1 and 6 (and preferably between 2 and 5) while the integer $x$ should be chosen between 2 and 4. It will be understood that whenever an integer is herein defined as being between two limiting numbers the range of values of such integer is to be taken as including both the limiting numbers.

Although I have shown and described certain embodiments of my invention for the purpose of illustration, it will be understood generally that adaptations, alterations a n d modifications thereof occurring to one skilled in the art may be made without departing from the scope of my invention as defined in the appended claims.

What is claimed is:

1. The method of manufacturing rubber-like materials by mixing a compound of the following formula:

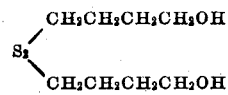

with an inorganic acid from the group consisting of concentrated sulphuric acid, phosphoric acid, and arsenic acid, and maintaining said mixture at a reactive temperature of the order of 150° C.

2. The method of manufacturing rubber-like materials by mixing a compound of the general formula $[(HO)C_nH_{2n}]_2S_x$ where $n$ is between 1 and 6, and $x$ is between 2 and 4, with an inorganic acid from the group consisting of concentrated sulphuric acid, phosphoric acid, and arsenic acid, and maintaining said mixture at a reactive temperature of the order of 150° C.

3. The method of manufacturing a rubber-like material by mixing equal parts by weight of a compound of the formula

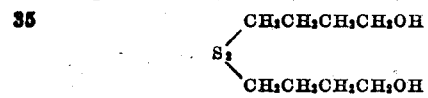

and concentrated sulphuric acid and maintaining said mixture at a reactive temperature of the order of 150° C.

4. The method of manufacturing a rubber-like material by mixing equal parts of dihydroxy ethyl disulphide and concentrated sulphuric acid and maintaining said mixture at a reactive temperature of the order of 150° C.

5. The method of manufacturing a rubber-like material by mixing equal parts of dihydroxy ethyl tetrasulphide and concentrated sulphuric acid and maintaining said mixture at a reactive temperature of the order of 150° C.

T. OKITA.